(12) United States Patent
Kim et al.

(10) Patent No.: US 8,495,617 B2
(45) Date of Patent: Jul. 23, 2013

(54) INTERWORKING SYSTEM BETWEEN USER TERMINAL AND SMART CARD FOR EXECUTING WIDGET, AND METHOD THEREOF

(75) Inventors: Jin Tae Kim, Seoul (KR); Eun Su Jung, Gyeonggi-Do (KR); Hoo Jong Kim, Gyeonggi-Do (KR)

(73) Assignee: SK Planet Co., Ltd. (KR)

( * ) Notice: Subject to any disclaimer, the term of this patent is extended or adjusted under 35 U.S.C. 154(b) by 137 days.

(21) Appl. No.: 12/736,701

(22) PCT Filed: Jul. 29, 2009

(86) PCT No.: PCT/KR2009/004234
§ 371 (c)(1),
(2), (4) Date: Oct. 29, 2010

(87) PCT Pub. No.: WO2010/024534
PCT Pub. Date: Mar. 4, 2010

(65) Prior Publication Data
US 2011/0138376 A1    Jun. 9, 2011

(30) Foreign Application Priority Data
Aug. 27, 2008  (KR) .................. 10-2008-0083978

(51) Int. Cl.
*G06F 9/44*  (2006.01)
*G06F 9/445* (2006.01)

(52) U.S. Cl.
USPC ........................... 717/173; 717/174; 717/178

(58) Field of Classification Search
None
See application file for complete search history.

(56) References Cited

U.S. PATENT DOCUMENTS

| 7,130,910 | B2 * | 10/2006 | Urien | 717/173 |
|---|---|---|---|---|
| 7,281,244 | B2 * | 10/2007 | de Jong | 717/174 |
| 7,844,834 | B2 * | 11/2010 | Leone et al. | 713/193 |
| 8,145,270 | B2 * | 3/2012 | Cho et al. | 455/559 |
| 2002/0065946 | A1 * | 5/2002 | Narayan | 709/315 |
| 2005/0057560 | A1 * | 3/2005 | Bibr et al. | 345/418 |

(Continued)

FOREIGN PATENT DOCUMENTS

| JP | 2003-216434 | 7/2003 |
|---|---|---|
| JP | 2005-301513 | 10/2005 |

(Continued)

OTHER PUBLICATIONS

Schaefer et al., "Using Smart Cards for Secure and Device Independent User Interfaces", 2007 ACM, MC'07 (Mobility'07), Sep. 10, 2007, Singapore, pp. 743-750; <http://dl.acm.org/citation.cfm?id=1378189>.*

(Continued)

*Primary Examiner* — Thuy Dao
*Assistant Examiner* — Ben C Wang
(74) *Attorney, Agent, or Firm* — Baker & Hostetler LLP (57) ABSTRACT

Disclosed are an interworking system between a user terminal and a smart card for executing a widget and a method thereof. The interworking system is configured to enable the user terminal to manage the download setup information for a widget UI (user interface) program installed in the smart card. The user terminal is able to download widget UI data to be updated from a program provision server based on the download setup information even if there is no additional request from the smart card. Therefore, the system is able to prevent periodic communication between the user terminal and the smart card when updating the widget UI program.

9 Claims, 6 Drawing Sheets

U.S. PATENT DOCUMENTS

| | | | |
|---|---|---|---|
| 2005/0184163 A1* | 8/2005 | de Jong | 235/492 |
| 2006/0080655 A1* | 4/2006 | Prevost | 717/173 |
| 2007/0101291 A1 | 5/2007 | Forstall et al. | |
| 2007/0131780 A1* | 6/2007 | Ho | 235/492 |
| 2007/0288917 A1* | 12/2007 | Sowa et al. | 717/174 |
| 2007/0294640 A1* | 12/2007 | Eskelinen et al. | 715/835 |
| 2009/0143105 A1* | 6/2009 | Cho et al. | 455/559 |
| 2009/0158344 A1* | 6/2009 | Anglin, Jr. | 725/46 |
| 2009/0201879 A1* | 8/2009 | Purkayastha et al. | 370/331 |
| 2010/0023777 A1* | 1/2010 | Prevost et al. | 717/173 |
| 2010/0269108 A1* | 10/2010 | Boudreau et al. | 717/178 |
| 2011/0004873 A1* | 1/2011 | Park et al. | 717/178 |
| 2011/0023023 A1* | 1/2011 | Chatterjee | 717/173 |
| 2011/0047053 A1* | 2/2011 | Kim et al. | 705/30 |
| 2011/0047257 A1* | 2/2011 | Lee et al. | 709/223 |
| 2011/0117961 A1* | 5/2011 | Kim et al. | 455/558 |
| 2011/0125967 A1* | 5/2011 | Kim et al. | 711/115 |
| 2011/0263295 A1* | 10/2011 | Kim | 455/558 |
| 2012/0101885 A1* | 4/2012 | Lee et al. | 705/14.23 |
| 2012/0168494 A1* | 7/2012 | Kim | 235/375 |
| 2012/0272231 A1* | 10/2012 | Kwon et al. | 717/173 |
| 2012/0311563 A1* | 12/2012 | Lee et al. | 717/178 |

FOREIGN PATENT DOCUMENTS

| | | |
|---|---|---|
| JP | 2008-504610 | 2/2008 |
| JP | 2011-015927 | 1/2011 |
| KR | 10-2008-001326 | 1/2008 |
| KR | 10-2008-0023891 | 3/2008 |

OTHER PUBLICATIONS

Kang et al., "Novel Process Methodology of Smart Combi Card (SCC) Manufacturing for RFID-USN", 2007 Springer-Verlag, ICUCT 2006, LNCS 4412, pp. 90-99; <http://download.springer.com/static/pdf/699/chp%253A10.1007%252F978-3-540-71789 8_10.pdf>.*

Feuvre et al., "Widgets Mobility", 2009 ACM, Mobility Sep. 2-4, 2009, Nice, France, pp. 1-4; <http://dl.acm.org/citation.cfm?id=1710035>.*

Noubissi et al., "Incremental Dynamic Update for Java-based Smart Cards", 2010 IEEE, pp. 110-113; <http://ieeexplore.ieee.org/stamp/stamp.jsp?tp=&arnumber=5464138>.*

* cited by examiner

INTERWORKING SYSTEM BETWEEN USER TERMINAL AND SMART CARD FOR EXECUTING WIDGET, AND METHOD THEREOF

TECHNICAL FIELD

One or more example embodiments relate to an interworking system between a user terminal and a smart card more particularly, to an interworking system between a user terminal and a smart card for executing a widget and a method thereof, in which download setup information for a widget UI (user interface) program installed in the smart card is managed in the user terminal so that the user terminal is able to periodically download widget UI data to be updated.

BACKGROUND ART

With the development of mobile communication technology, a mobile communication terminal is equipped with various functions, such as the Internet, text message service and multimedia functions, as well as the basic voice communication function. Since the mobile communication terminal is provided with various services and specific functions, such as the multimedia and camera functions, the screen size of the mobile communication terminal is gradually enlarged and the resolution is continuously increased. In addition, as consumer demand becomes more diversified, it is necessary to effectively utilize the screen of the mobile communication terminal.

In this regard, a method of fast accessing applications in the mobile communication terminal such that a user can easily and simply access the applications having higher preference has been suggested. For instance, a method of arranging at least one application in the form of a widget on the screen where a specific application is executed has been suggested.

Meanwhile, conventionally, mobile service applications are provided in a software platform of the mobile terminal. However, as smart card technology has tended toward large scale and high speed interface, the application on card technology has been suggested to provide the service application in the USIM (universal subscriber identity module) card.

In addition, various technologies are discussed to provide the service application in a large scale smart card. In this regard, it is necessary to provide a new interface between the user terminal and the smart card such that the conventional idle screen widget, which is based on the applications in the mobile communication terminal, can be replaced with the new idle screen widget, which is based on the application on card technology of the smart card.

DISCLOSURE

Technical Problem

The present invention has been made to solve the above problems occurring in the prior art, and an object of the present invention is to provide an interworking system between a user terminal and a smart card for executing a widget and a method thereof, in which download setup information for a widget UI (user interface) program installed in the smart card is managed in the user terminal so that the user terminal is able to periodically download widget UI data to be updated.

Technical Solution

According to one or more embodiments, there may be provided an interworking system between a user terminal and a smart card for executing a widget, including: a program provision server for providing widget UI (user interface) data to be updated; a user terminal for accessing the program provision server based on widget download setup information, downloading the widget UI data and displaying the widget UI data by mapping the downloaded widget UI data to execution screen information of a widget UI program; and a smart card for providing the user terminal with the execution screen information and the widget download setup information according to an execution of the widget UI program installed in the smart card.

According to the exemplary embodiments, the smart card sets the widget download setup information, which includes information of widget UI data to be updated, access URL information of the program provision server, and access frequency information to the program provision server, for each widget UI program installed in the smart card and provides the widget download setup information to the user terminal.

According to one or more embodiments, there may be provided a user terminal for providing an update environment according to an execution of a widget UI program installed in a smart card, including: a card interworking module for providing an interface with respect to the smart card to receive widget download setup information from the smart card according to the execution of the widget UI program; an update interworking module for downloading widget UI data to be updated from a program provision server based on the widget download setup information received from the smart card and mapping the downloaded widget UI data to execution screen information according to the execution of the widget UI program; and an input/output module displaying the execution screen information, which is updated through the mapping of the downloaded widget UI data.

According to the exemplary embodiments, the update interworking module periodically accesses the program provision server based on the widget download setup information including information of widget UI data to be updated, access URL information of the program provision server, and access frequency information to the program provision server and downloads the widget UI data to be updated from the program provision server.

According to one or more embodiments, there may be provided a smart card interworking with a user terminal to execute a widget UI program installed in the smart card, including: a terminal interworking module for providing an interface with respect to the user terminal to enable the smart card to make data communication with the user terminal; and a widget core module for providing execution screen information according to an execution of a widget UI program and providing widget download setup information to the user terminal as the widget UI program is executed and, requesting an update for the widget UI data mapped to the execution screen information.

According to the exemplary embodiments, the widget core module sets the widget download setup information, which includes information of widget UI data to be updated, access URL information of a program provision server providing the widget UI data to be updated, and access frequency information to the program provision server, for each widget UI program installed in the widget core module and provides the widget download setup information to the user terminal.

According to one or more embodiments, there may be provided an interworking method between a user terminal and a smart card for executing a widget, including: executing, by the smart card, a widget UI program installed in the smart card; providing, by the smart card, execution screen information to the user terminal according to an execution of the widget UI program; providing, by the smart card, widget download setup information to the user terminal; accessing, by the user terminal, a program provision server based on the widget download setup information received from the smart card; downloading, by the user terminal, widget UI data to be updated from the program provision server and mapping the downloaded widget UI data to the execution screen information; and displaying, by the user terminal, the execution screen information, which is updated through the mapping of the downloaded widget UI data.

According to the exemplary embodiments, the step of providing the widget download setup information to the user terminal includes the step of setting the widget download setup information, which includes information of widget UI data to be updated, access URL information of the program provision server, and access frequency information to the program provision server, for each widget UI program installed in the smart card to provide the widget download setup information to the user terminal.

According to one or more embodiments, there may be provided a method of driving a user terminal to provide an update environment according to an execution of a widget UI program installed in a smart card, including: receiving execution screen information from the smart card according to the execution of the widget UI program; receiving widget download setup information from the smart card; downloading widget UI data to be updated by accessing a program provision server based on the widget download setup information; and mapping the downloaded widget UI data to the execution screen information to display the widget UI data.

According to the exemplary embodiments, the step of downloading the widget UI data includes the step of downloading the widget UI data to be updated by periodically accessing the program provision server based on the widget download setup information, which includes information of the widget UI data to be updated, access URL information of the program provision server, and access frequency information to the program provision server.

According to one or more embodiments, there may be provided a method of operating a smart card to execute a widget UI program installed in the smart card by interworking with a user terminal, including: executing the widget UI program installed in the smart card; providing execution screen information to the user terminal according to an execution of the widget UI program; and requesting an update for widget UI data mapped to the execution screen information by providing widget download setup information to the user terminal according to the execution of the widget UI program.

According to the exemplary embodiments, the step of requesting the update for the widget UI data includes the step of setting the widget download setup information, which includes information of the widget UI data to be updated, access URL information of a program provision server providing the widget UI data to be updated, and access frequency information to the program provision server, for each widget UI program installed in the smart card to provide the widget download setup information to the user terminal.

Advantageous Effects

According to the interworking system between the user terminal and the smart card for executing the widget and the interworking method of the present invention, the download setup information for the widget UI (user interface) program installed in the smart card can be managed in the user terminal so that the user terminal is able to periodically download the program to be updated without periodic communication between the user terminal and the smart card. Thus, power consumption caused by the interworking operation between the user terminal and the smart card can be reduced.

BEST MODE

Mode for Invention

Hereinafter, the exemplary embodiments of the present invention will be described in detail with reference to accompanying drawings.

Figure 1:
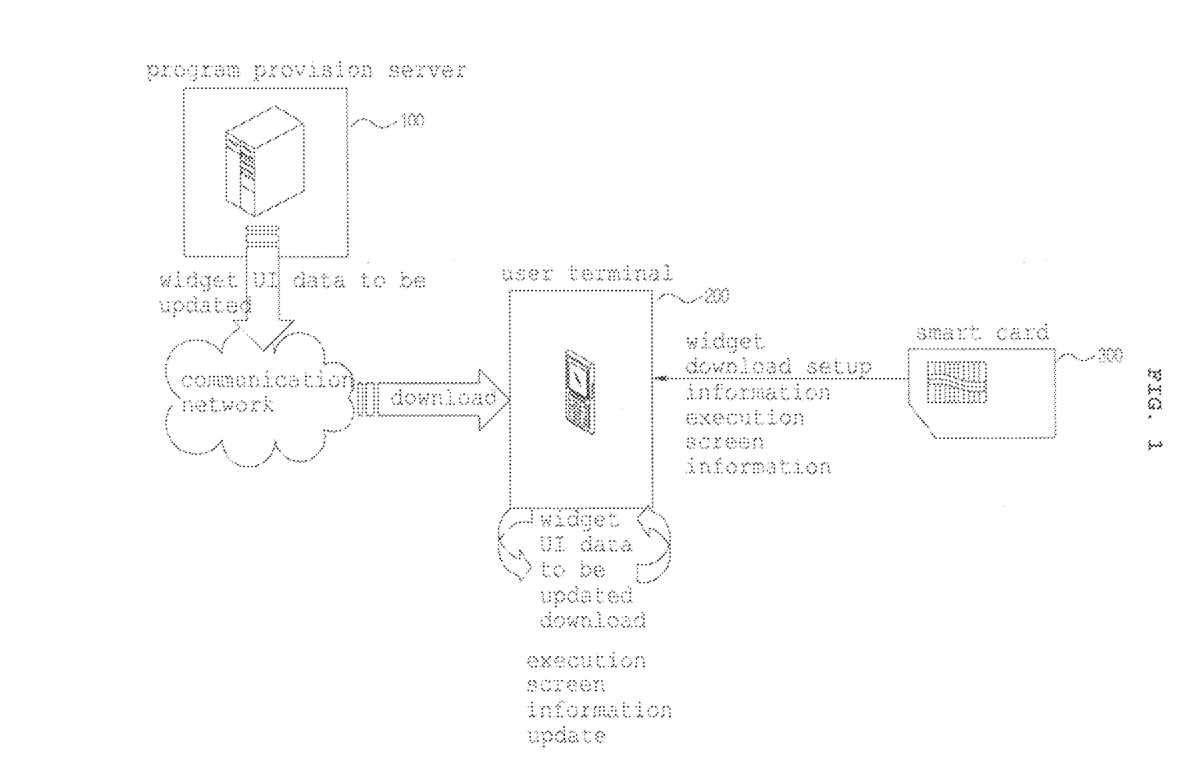
FIG. 1 is a schematic view showing the structure of an interworking system between a user terminal and a smart card for executing a widget according to an embodiment of the present invention.

FIG. 1 is a schematic view showing the structure of an interworking system between a user terminal and a smart card for executing a widget according to an embodiment of the present invention.

As shown in FIG. 1, the interworking system includes a program provision server 100 for providing widget UI (user interface) data to be updated, a user terminal 200 that downloads the widget UI data to update the widget UI data, and a smart card 300 that executes the widget UI program installed therein and requests the update for the widget UI data mapped to execution screen information. The widget UI data refers to information which must be periodically updated, such as the UI program for providing weather, fortune and time information.

The user terminal 200 stores widget download setup information provided from the smart card 300 according to the execution of the widget UI program installed in the smart card 300, and accesses the program provision server 100 based on access URL information included in the widget download setup information. In more detail, the user terminal 200 drives a browser installed in the user terminal 200 according to access frequency information included in the widget download setup information in order to try the periodic access to the program provision server 100.

In addition, the user terminal 200 downloads the widget UI data to be updated from the program provision server 100 and displays the widget UI data by mapping the widget UI data to execution screen information of the widget UI program provided from the smart card 300. In more detail, the user terminal 200 downloads the widget UI data from the program provision server 100 based on information of widget UI data to be updated included in the widget download setup information. In addition, the user terminal 200 updates the execution screen information by mapping the downloaded widget UI data to the execution screen information of the widget UI program provided from the smart card 300 according to the execution of the widget UI program and displays the updated execution screen information.

The smart card 300 provides the user terminal 200 with the execution screen information of the widget UI program and the widget download setup information, which is set for each widget UI program, according to the execution of the widget UI program installed in the smart card 300. In more detail, the smart card 300 sets the widget download setup information, which includes the information of widget UI data to be updated, the access URL information of the program provision server 100, and the access frequency information to the program provision server 100, for each widget UI program installed in the smart card 300. As the widget UI program is executed, the smart card 300 provides the widget download setup information to the user terminal 200 to request the download for the widget UI data mapped to the execution screen information.

As described above, according to the interworking system between the user terminal and the smart card for executing the widget of the present invention, the widget download setup information for the widget UI program installed in the smart card 300 can be managed in the user terminal 200, so that the user terminal 200 can download the widget UI data to be updated from the program provision server 100 based on the widget download setup information even if there is no additional request from the smart card 300.

Hereinafter, the structure of the user terminal and the smart card will be described in detail with reference to FIGS. 2 and 3.

Figure 2:
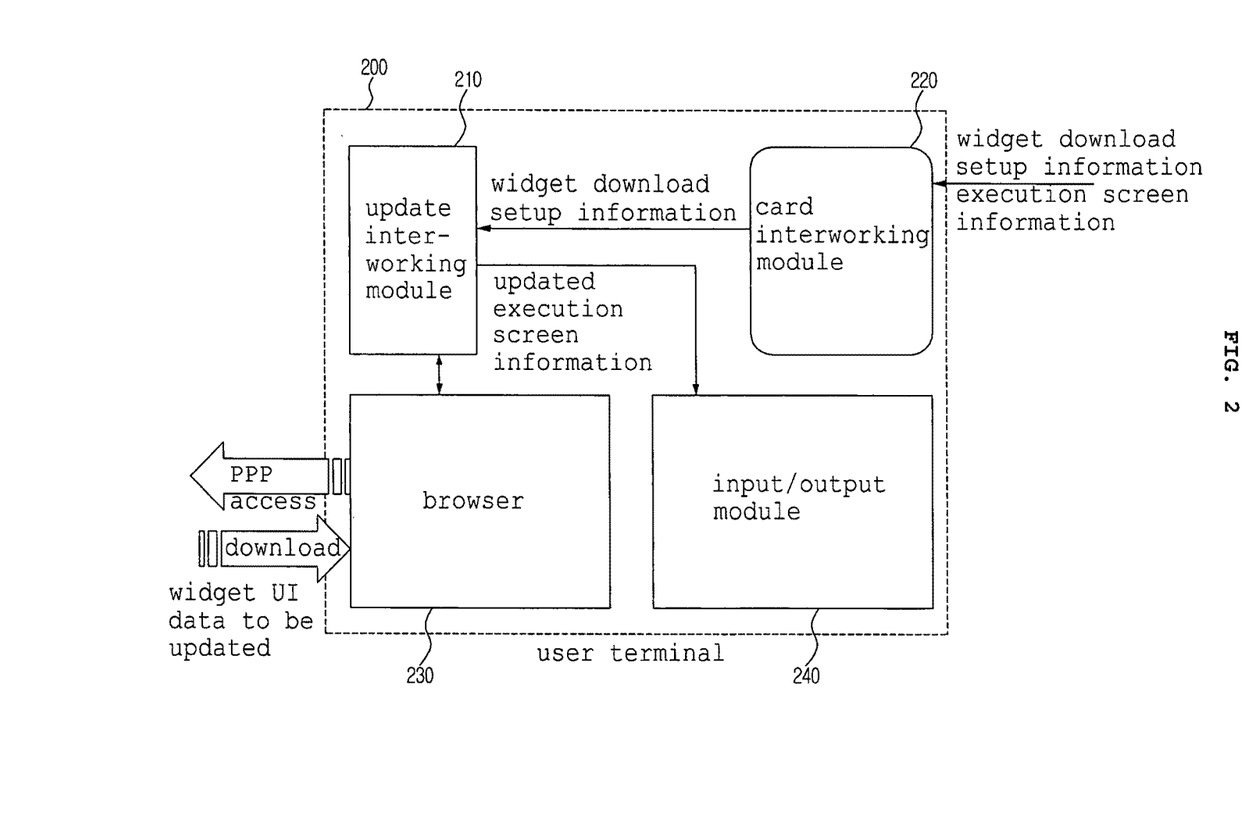
FIG. 2 is a schematic view showing the structure of a user terminal according to an embodiment of the present invention.
Figure 3:
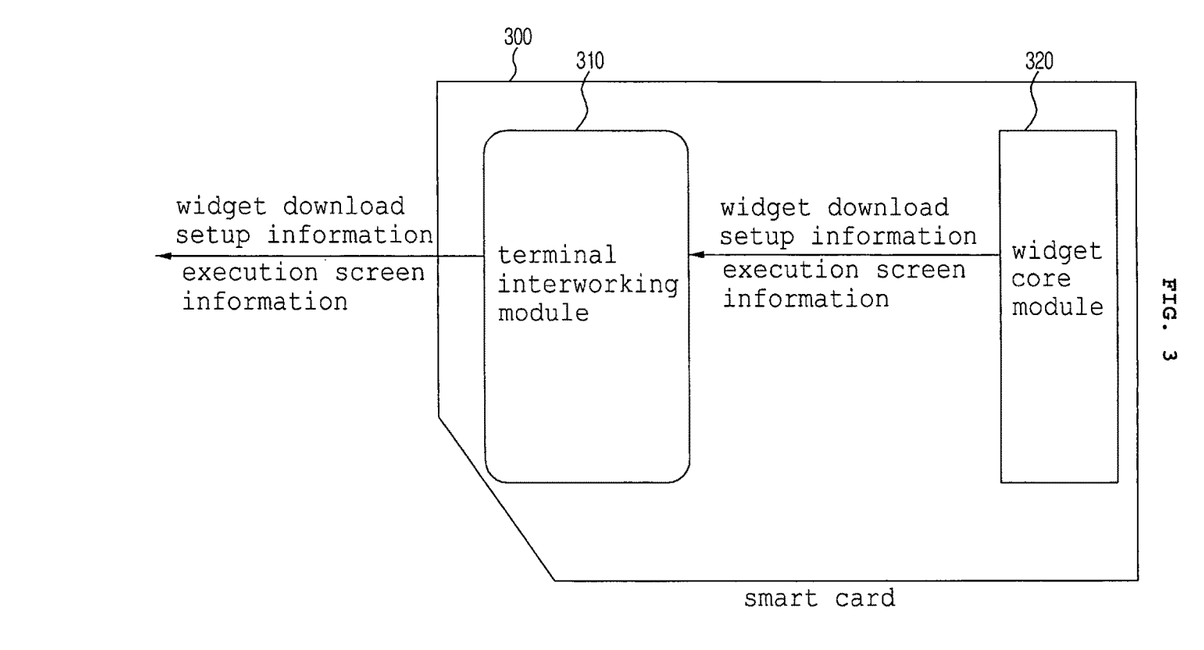
FIG. 3 is a view showing the structure of a smart card according to an embodiment of the present invention.

Referring to FIG. 2, the user terminal 200 includes a card interworking module 210 that provides an interface with respect to the smart card 300 to enable the user terminal 200 to make data communication with the smart card 300, an update interworking module 220 that downloads the widget UI data to be updated from the program provision server 100 to update the widget UI data, a browser 230 that provides an access environment with respect to the program provision server 100 upon the request from the update interworking module 220, and an input/output module 240 that displays the execution screen information of the widget UI program.

The card interworking module 210 provides a USB (universal serial bus) interface with respect to the smart card 300 and transmits the execution screen information and the download setup information received from the smart card 300 according to the execution of the widget UI program to the update interworking module 220 through the USB interface.

The update interworking module 220 stores the widget download setup information, which is received from the smart card 300 through the card interworking module 210 as the widget UI program installed in the smart card 300 is executed, and accesses the program provision server 100 based on the access URL information included in the stored widget download setup information. In more detail, the update interworking module 220 drives the browser 230 according to the access frequency information included in the widget download setup information in order to try the periodic access to the program provision server 100.

In addition, the update interworking module 220 downloads the widget UI data to be updated from the program provision server 100 and maps the widget UI data to the execution screen information of the widget UI program provided from the smart card 300 to update the execution screen information of the widget UI program. In more detail, the update interworking module 220 downloads the widget UI data to be updated from the program provision server 100 based on the information of the widget UI data to be updated included in the widget download setup information. In addition, the update interworking module 220 updates the execution screen information of the widget UI program by mapping the downloaded widget UI data to the execution screen information of the widget UI program provided from the smart card 300 according to the execution of the widget UI data and displays the updated execution screen information through the input/output module 240.

Meanwhile, for instance, the update interworking module 220 can be installed in the user terminal 200 together with a predetermined widget UI program when a specific widget UI program is installed in the smart card 300. In addition, in the case that the smart card 300 is installed in a new user terminal due to the change of the user terminal, the update interworking module 220 can be installed in the user terminal 200 when the user terminal 200 is reset or the widget UI program is executed. Preferably, the update interworking module 220 is previously installed before the update for the widget UI data is performed.

The browser 230 provides the access environment with respect to the program provision server 100 upon the request from the update interworking module 220. In more detail, the browser 230 provides the access environment with respect to the program provision server 100 by using the PPP (point to point protocol) upon the request from the update interworking module 220.

The input/output module 240 displays the execution screen information, which is updated as the downloaded widget UI data are mapped thereto. In more specifically, the input/output module 240 displays the execution screen information of the widget UI program, which is updated through the mapping of the downloaded widget UI data, by receiving the execution screen information from the update interworking module 220.

As described above, the user terminal 200 having the above structure according to the present invention can manage the download setup information, so that the user terminal 200 can download and update the widget UI data by periodically accessing the program provision server 100 based on the widget download setup information even if there is no additional request from the smart card 300.

Hereinafter, the structure of the smart card 300 will be described in detail with reference to FIG. 3. The smart card 300 includes a terminal interworking module 310 that provides an interface with respect to the user terminal 200 to enable the smart card 300 to make data communication with the user terminal 200, and a widget core module 320 that executes the widget UI program installed in the smart card 300.

The terminal interworking module 310 provides a USB (universal serial bus) interface with respect to the user terminal 200 and transmits the execution screen information of the widget UI program and the download setup information received from the widget core module 320 to the user terminal 200 through the USB interface.

The widget core module 320 provides the user terminal 200 with the execution screen information of the widget UI program and the download setup information as the widget UI program installed in the widget core module 320 is executed. In more specifically, the widget core module 320 sets the widget download setup information, which includes the information of the widget UI data to be updated, the access URL information of the program provision server 100, and the access frequency information to the program provision server 100, for each widget UI program installed in the widget core module 320. As the widget UI program is executed, the widget core module 320 provides the widget download setup information to the user terminal 200 to request the download for the widget UI data mapped to the execution screen information.

As described above, according to the structure of the smart card 300 of the present invention, the widget download setup information for the widget UI program installed in the smart card 300 can be managed in the user terminal 200, so that the user terminal 200 can periodically update the widget UI data even if there is no additional request from the smart card 300.

Figure 4:
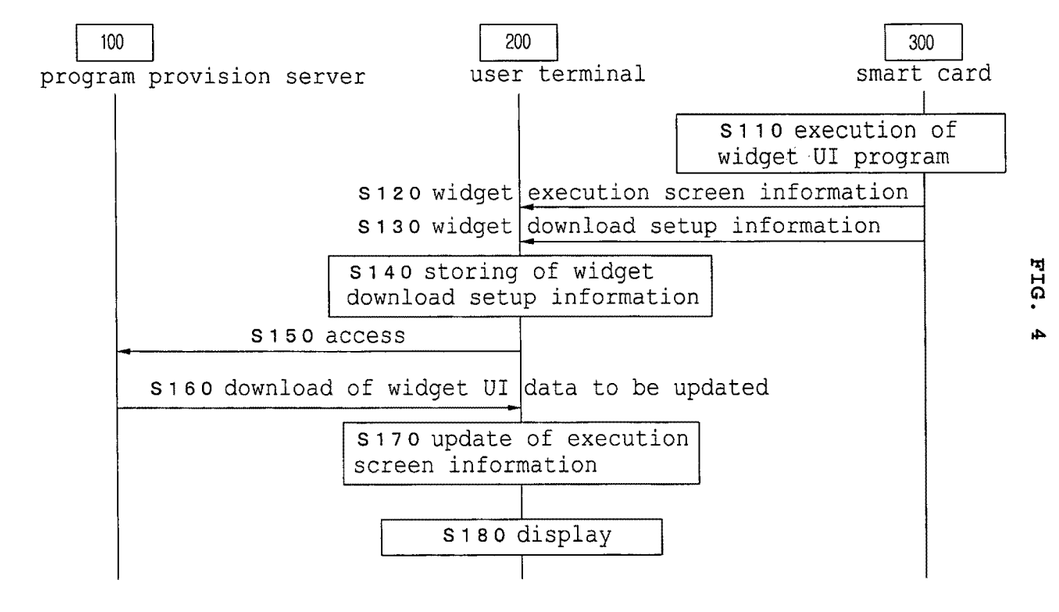
FIG. 4 is a flowchart showing the procedure for operating an interworking system between a user terminal and a smart card for executing a widget according to an embodiment of the present invention.
Figure 5:
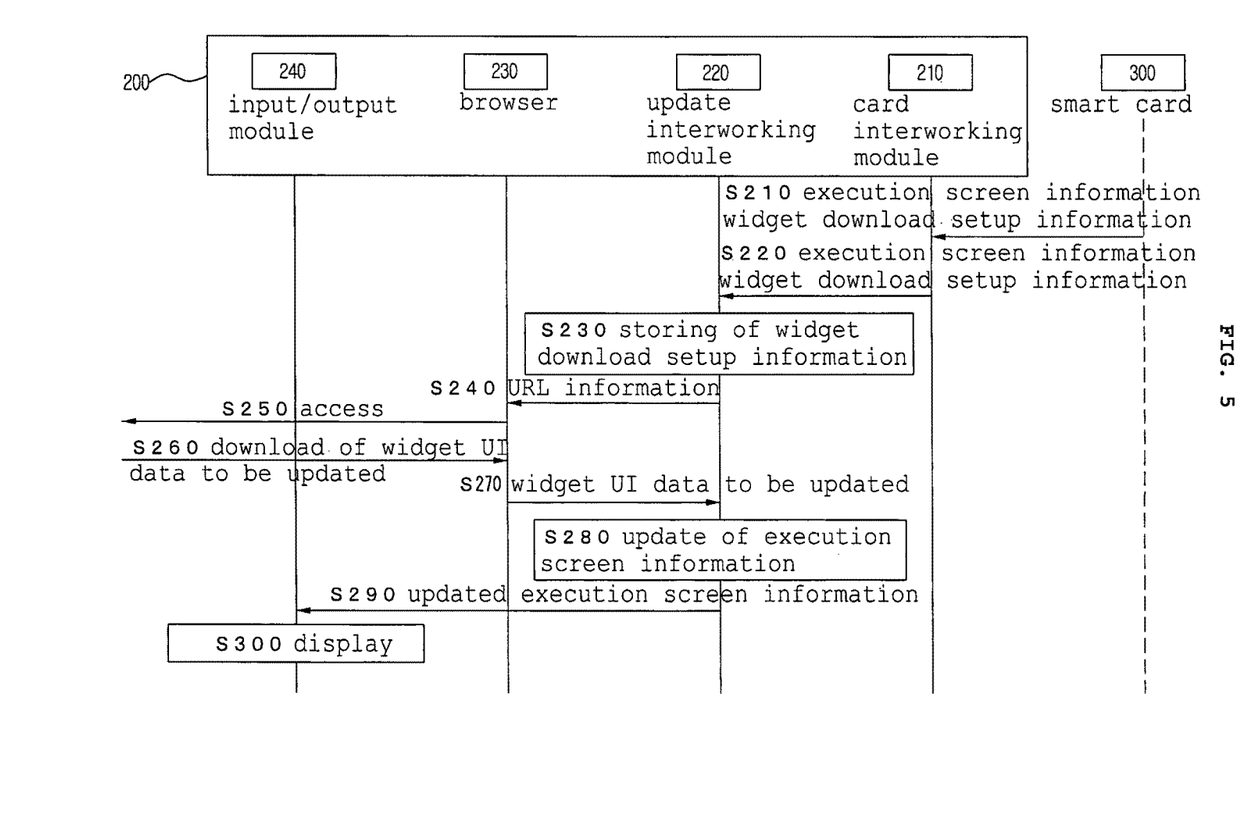
FIG. 5 is a flowchart showing the procedure for operating a user terminal according to an embodiment of the present invention.
Figure 6:
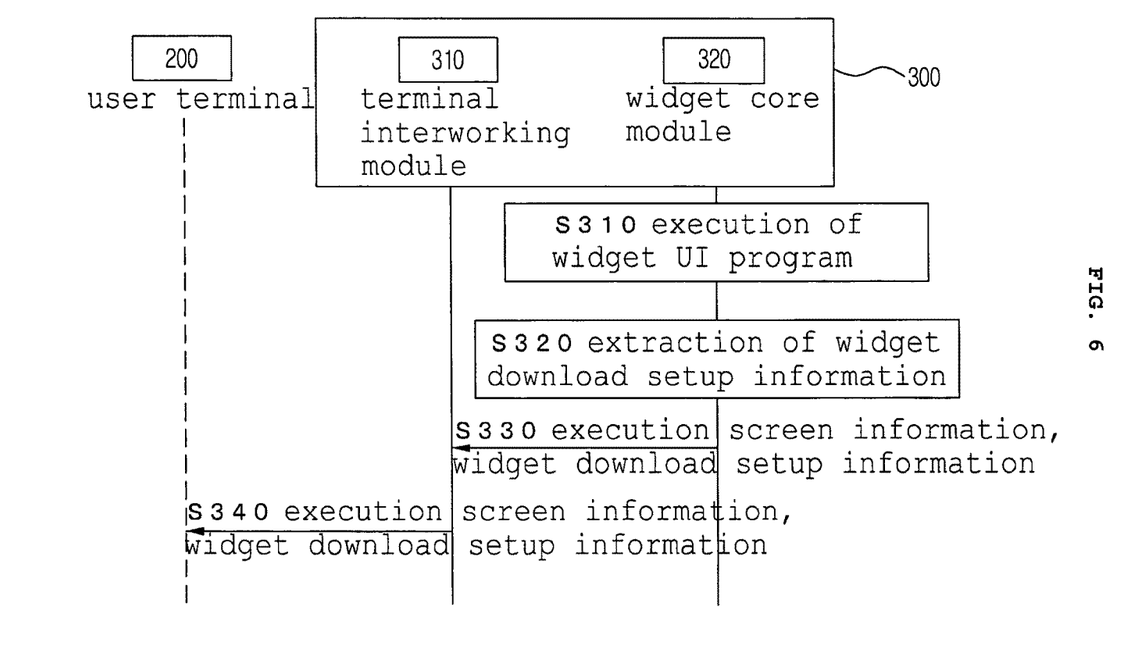
FIG. 6 is a flowchart showing the procedure for operating a smart card according to an embodiment of the present invention.

Hereinafter, the interworking method between the user terminal and the smart card for executing the widget according to the embodiment of the present invention will be described with reference to FIGS. 4 to 6. For the purpose of convenience, the same reference numerals will be used to refer to the same elements throughout the drawings.

First, the method of driving the interworking system between the user terminal and the smart card for executing the widget according to the embodiment of the present invention will be described with reference to FIG. 4.

The smart card 300 executes the UI program installed in the smart card 300 and provides the execution screen information to the user terminal 200 according to the execution of the widget UI program (S110 and S120).

Then, the smart card 300 provides the widget download setup information to the user terminal 200 (S130). Preferably, the smart card 300 sets the widget download setup information, which includes the information of the widget UI data to be updated, the access URL information of the program provision server 100, and the access frequency information to the program provision server 100, for each widget UI program installed in the smart card 300 and provides the widget download setup information to the user terminal 200 to request the download for the widget UI program to be updated.

After that, the user terminal 200 accesses the program provision server 100 based on the widget download setup information received from the smart card 300 (S140 and S150). Preferably, as the smart card 300 executes the widget UI program, the user terminal 200 stores the widget download setup information provided from the smart card 300 and accesses the program provision server 100 based on the access URL information included in the widget download setup information. At this time, the user terminal 200 drives the browser installed in the user terminal 200 according to the access frequency information included in the widget download setup information to try the periodic access to the program provision server 100.

Then, the user terminal 200 downloads the widget UI data to be updated from the program provision server 100 and maps the widget UI data to the execution screen information (S160 and S170). Preferably, the user terminal 200 downloads the widget UI data from the program provision server 100 based on the information of the widget UI data to be updated included in the widget download setup information. In addition, the user terminal 200 maps the downloaded widget UI data to the execution screen information of the widget UI program provided from the smart card 300 according to the execution of the widget UI program, thereby updating the execution screen information.

After that, the user terminal 200 displays the execution screen information, which is updated through the mapping of the downloaded widget UI data (S180).

As described above, according to the method of driving the interworking system between the user terminal and the smart card for executing the widget of the present invention, the widget download setup information for the widget UI program installed in the smart card 300 can be managed in the user terminal 200, so that the user terminal 200 can update the widget UI data by receiving the widget UI data from the program provision server 100 based on the widget download setup information even if there is no additional request from the smart card 300.

Hereinafter, the method of driving the user terminal according to the embodiment of the present invention will be described with reference to FIG. 5.

First, as the smart card 300 executes the widget UI program installed in the smart card 300, the user terminal 200 receives the execution screen information and widget download setup information from the smart card 300 (S210 and S220). Preferably, the card interworking module 210 provides the USB interface with respect to the smart card 300 and transmits the execution screen information and the download setup information received from the smart card 300 according to the execution of the widget UI program to the update interworking module 220 through the USB interface.

Then, the user terminal 200 accesses the program provision server 100 based on the widget download setup information to download the widget UI data to be updated (S230 to S270). Preferably, the update interworking module 220 stores the widget download setup information, which is received from the smart card 300 through the card interworking module 210 as the widget UI program installed in the smart card 300 is executed, and accesses the program provision server 100 based on the access URL information included in the widget download setup information. At this time, the update interworking module 220 drives the browser 230 according to the access frequency information included in the widget download setup information in order to try the periodic access to the program provision server 100.

After that, the user terminal 200 displays the downloaded widget UI data by mapping the downloaded widget UI data to the execution screen information (S280 to S300). Preferably, the update interworking module 220 updates the execution screen information of the widget UI program by mapping the downloaded widget UI data to the execution screen information of the widget UI program provided from the smart card 300 according to the execution of the widget UI data and displays the updated execution screen information through the input/output module 240.

As described above, the user terminal 200 having the above structure according to the present invention can manage the download setup information, so that the user terminal 200 can download and update the widget UI data by periodically accessing the program provision server 100 based on the widget download setup information even if there is no additional request from the smart card 300.

Hereinafter, the operation of the smart card according to the embodiment of the present invention will be described with reference to FIG. 6.

First, the smart card 300 executes the widget UI program installed in the smart card 300 (S310). Preferably, the widget core module 320 executes the widget UI program installed in the widget core module 320.

Then, the smart card 300 provides the user terminal 200 with the execution screen information and the widget download setup information according to the execution of the widget UI program (S320 to S340). Preferably, the widget core module 320 extracts the widget download setup information, which includes the information of the widget UI data, the access URL information of the program provision server 100, and the access frequency information to the program provision server 100, and provides the extracted widget download setup information to the user terminal 200 through the terminal interworking module 310 to request the download for the widget UI data mapped to the execution screen information.

As described above, according to the operation of the smart card 300 of the present invention, the widget download setup information for the widget UI program installed in the smart card 300 can be managed in the user terminal 200, so that the user terminal 200 can periodically update the widget UI data even if there is no additional request from the smart card 300.

Meanwhile, the method and steps of the algorithm described above related to the embodiments of the present invention may be realized in the form of hardware or software executed by a processor, or combination of the hardware and software. The software module may reside in a storage medium, such as a RAM memory, a flash memory, a ROM memory, an EPROM memory, an EEPROM memory, registers, a hard disc, a mobile disc, a CD-ROM, or other storage devices generally known in the art. The storage medium is connected to the processor, so that the processor may read information from the storage medium or record the information onto the storage medium. Alternatively, the storage medium can be integrated in the processor. The processor and the storage medium may be included in an ASIC. The ASIC may be included in the terminal. Alternatively, the processor and the storage medium may serve as components of the terminal.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

INDUSTRIAL APPLICABILITY

According to the interworking system between the user terminal and the smart card for executing the widget and the interworking method of the present invention, the widget download setup information for each widget UI program installed in the smart card can be managed in the user terminal, so that the user terminal can periodically download the widget UI data. Thus, the present invention may solve the problems occurring in the prior art, so that the present invention is applicable in various fields in terms of sales and business and very useful in practice with higher industrial applicability.

The invention claimed is:

1. An interworking method between a user terminal and a smart card for executing a widget, the interworking method comprising;
   executing, by the smart card, a widget UI program installed in the smart card;
   using the smart card to communicate with a program provision server to provide the user terminal with execution screen information of the widget UI program and widget download setup information according to an execution of the widget UI program;
   wherein said widget download setup information provided to the user terminal includes information of widget UI data to be updated, and uniform resource locater ("URL") information and frequency information accessed from the program provision server, to enable the widget UI program installed in the smart card to provide the widget download setup information to the user terminal;
   downloading, by the user terminal, widget UI data to be updated from the program provision server and mapping the downloaded widget UI data to the execution screen information; and
   displaying, by the user terminal, the execution screen information, which is updated through the mapping of the downloaded widget UI data.

2. An interworking system for executing a widget, the interworking system comprising:
   a program provision server for providing widget UI (user interface) data to be updated;
   a user terminal for accessing the program provision server based on widget download setup information, downloading the widget UI data and displaying the widget UI data by mapping the downloaded widget UI data to execution screen information of a widget UI program; and
   a smart card for communicating with the provision server for providing the user terminal with the execution screen information and the widget download setup information according to an execution of a widget UI program installed in the smart card,
   wherein the smart card sets the widget download setup information, including information of widget UI data to be updated by accessing uniform resource locater ("URL") information and frequency information from the program provision server such that the widget UI program installed in the smart card will enable the smart card to provide the widget download setup information to the user terminal.

3. A user terminal for providing an update environment according to an execution of a widget UI program installed in a smart card to enable the smart card to communicate with a program provision server to provide the user terminal with execution screen information of the widget UI program and widget download setup information including information of widget UI data to be updated, uniform resource locater ("URL") information and frequency information accessed by the smart card from the program provision server, with the user terminal comprising:
   a memory storing executable instructions;
   a card interworking module for providing an interface with respect to the smart card to receive said widget download setup information from the smart card according to the execution of the widget UI program;
   an update interworking module for downloading said widget UI data to be updated from said program provision server based on the widget download setup information received from the smart card and mapping the downloaded widget UI data to execution screen information according to the execution of the widget UI program; and
   an input/output module displaying the execution screen information, which is updated through the mapping of the downloaded widget UI data.

4. The user terminal of claim 3, wherein the update interworking module periodically accesses the program provision server based on the widget download setup information including information of widget UI data to be updated, access URL information of the program provision server, and access frequency information to the program provision server and downloads the widget UI data to be updated from the program provision server.

5. A smart card interworking with a user terminal including a memory storing executable instructions to execute a widget UI program containing widget UI data installed in the smart card to enable the smart card to communicate with a program provision server and to access uniform resource locater ("URL") information and frequency information from the program provision server, said smart card comprising:

a terminal interworking module for providing an interface with respect to the user terminal to enable the smart card to make data communication with the user terminal;

a widget core module for further providing the user terminal with execution screen information according to an execution of a widget UI program and providing widget download setup information to the user terminal as the widget UI program is executed, and requesting an update for the widget UI data mapped to the execution screen information, wherein the smart card sets the widget download setup information including information of widget UI data to be updated, accesses uniform resource locater ("URL") information of the program provision server, accesses frequency information from the program provision server, for the widget UI program installed in the smart card and provides the widget download setup information to the user terminal.

6. A method of driving a user terminal to provide an update environment according to an execution of a widget UI program containing widget UI data installed in a smart card, the method comprising:

using said smart card for communicating with a program provision server for providing the user terminal with execution screen information according to the execution of the widget UI program;

using said smart card to download setup information and for updating said widget UI data by periodically accessing the program provision server based on the widget download setup information, and for updating the widget UI data by accessing uniform resource locater ("URL") information and frequency information from the program provision server; and mapping the downloaded widget UI data to the execution screen information to display the widget UI data.

7. A method of operating a smart card to execute a widget UI program installed in the smart card by interworking with a user terminal, the method comprising:

using the smart card to communicate with a program provision server to provide the user terminal with execution screen information of the widget UI program and with widget download setup information;

executing the widget UI program installed in the smart card;

providing execution screen information to the user terminal according to the execution of the widget UI program; and requesting an update for widget UI data mapped to the execution screen information by providing widget download setup information to the user terminal according to the execution of the widget UI program with the widget UI data being updated by the smart cart accessing uniform resource locater ("URL") information and frequency information from the program provision server to provide the widget download setup information to the user terminal.

8. A non-transitory computer readable recording medium comprising computer readable code to control at least one processing device to implement a method of driving a user terminal to provide an update environment according to an execution of a widget UI program installed in a smart card to enable the smart card to communicate with a program provision server and to access uniform resource locater ("URL") information of the program provision server, and to access frequency information to the program provision server, the method comprising:

receiving execution screen information from the smart card according to the execution of the widget UI program;

receiving widget download setup information from the smart card;

downloading widget UI data to be updated by accessing said a program provision server based on the widget download setup information; and mapping the downloaded widget UI data to the execution screen information to display the widget UI data.

9. A non-transitory computer-readable recording medium comprising computer readable code to control at least one processing device to implement a method of operating a smart card to execute a widget UI program installed in the smart card by interworking with a user terminal to enable the smart card to communicate with a program provision server to provide the user terminal with execution screen information of the widget UI program and widget download setup information including information of widget UI data to be updated, access uniform resource locater ("URL") information of the program provision server, and access frequency information to the program provision server, said method comprising:

executing the widget UI program installed in the smart card;

providing execution screen information to the user terminal according to an execution of the widget UI program; and requesting an update for widget UI data mapped to the execution screen information by providing widget download setup information to the user terminal according to the execution of the widget UI program.

* * * * *